(12) United States Patent
Torigata

(10) Patent No.: US 10,316,197 B2
(45) Date of Patent: Jun. 11, 2019

(54) ANTI-CORROSIVE COATING COMPOSITION

(71) Applicant: TECH-TAIYO KOGYO CO., LTD., Tokyo (JP)

(72) Inventor: Hiroshi Torigata, Tokyo (JP)

(73) Assignee: TECH-TAIYO KOGYO CO., LTD., Tokyo (JP)

(*) Notice: Subject to any disclaimer, the term of this patent is extended or adjusted under 35 U.S.C. 154(b) by 0 days.

(21) Appl. No.: 15/112,229

(22) PCT Filed: Jan. 20, 2016

(86) PCT No.: PCT/JP2016/051527
§ 371 (c)(1),
(2) Date: Jul. 18, 2016

(87) PCT Pub. No.: WO2016/111382
PCT Pub. Date: Jul. 14, 2016

(65) Prior Publication Data
US 2016/0333191 A1    Nov. 17, 2016

(30) Foreign Application Priority Data

Feb. 24, 2015 (JP) ................................. 2015-033692
Oct. 23, 2015 (JP) ................................. 2015-209426

(51) Int. Cl.
| | | |
|---|---|---|
| C09D 5/08 | (2006.01) | |
| C09D 163/00 | (2006.01) | |
| C09D 171/00 | (2006.01) | |
| C09D 7/40 | (2018.01) | |
| C09D 7/61 | (2018.01) | |
| C09D 7/63 | (2018.01) | |
| C09D 7/65 | (2018.01) | |
| C08K 5/00 | (2006.01) | |

(52) U.S. Cl.
CPC .............. *C09D 5/08* (2013.01); *C09D 5/082* (2013.01); *C09D 7/40* (2018.01); *C09D 7/61* (2018.01); *C09D 7/63* (2018.01); *C09D 7/65* (2018.01); *C09D 163/00* (2013.01); *C09D 171/00* (2013.01); *C08G 2650/56* (2013.01); *C08K 5/00* (2013.01)

(58) Field of Classification Search
None
See application file for complete search history.

(56) References Cited

U.S. PATENT DOCUMENTS

| | | | |
|---|---|---|---|
| 5,441,772 A | 8/1995 | McAndrew et al. | |
| 2012/0288659 A1* | 11/2012 | Hoshi ................... | C09J 133/20 428/41.8 |
| 2013/0327992 A1* | 12/2013 | Edgington ............ | C09D 5/086 252/389.24 |
| 2014/0024759 A1* | 1/2014 | Torigata ................ | C09D 5/082 524/376 |

FOREIGN PATENT DOCUMENTS

| | | |
|---|---|---|
| JP | 63-139952 | 6/1988 |
| JP | 63-183971 | 7/1988 |
| JP | 63-199884 | 8/1988 |
| JP | 2007-324143 | 12/2007 |
| JP | 2011-523431 | 8/2011 |
| JP | 2014-037522 | 2/2014 |
| WO | WO 93/14166 | * 1/1993 |
| WO | 2009/139590 | 11/2009 |
| WO | 2012/147437 | 11/2012 |
| WO | 2014/081798 | 5/2014 |

OTHER PUBLICATIONS

Machine translation of JP 2007-324143 Tadayuki et at. p. 1-16.*
International Search Report, dated Apr. 5, 2016 (Apr. 5, 2016).
European Search Report dated Jul. 10, 2017, 5 pages.

* cited by examiner

*Primary Examiner* — Robert T Butcher
(74) *Attorney, Agent, or Firm* — Rankin, Hill & Clark LLP

(57) ABSTRACT

An anti-corrosive coating composition having anti-corrosion performance which enables the anti-corrosive coating composition to reduce the generation of rust by salt water spray testing.

The anti-corrosive coating composition contains polyaniline component and coating film component. The coating film component is composed of phenoxy resin.

1 Claim, 4 Drawing Sheets

ANTI-CORROSIVE COATING COMPOSITION

TECHNICAL FIELD

The present invention relates to an anti-corrosive coating composition.

BACKGROUND ART

Conventionally, an anti-corrosive coating composition including polyaniline and epoxy resin as a coating film composition (for example, refer to Patent Literature 1).

CITATION LIST

Patent Literature

Patent Literature 1: Japanese Patent Application Laid-open No. 2007-324143

SUMMARY OF INVENTION

Technical Problem

However, the conventional anti-corrosive coating composition including polyaniline and epoxy resin as the coating film composition is inconvenient in that after applying on a steel plate to form a coating film, rust is violently generated in 576 hours when a salt water spray testing is performed according to the method prescribed in Japanese Industrial Standards JIS Z 2371.

The present invention aims to solve such inconvenience and it is an object of the present invention to provide an anti-corrosive coating composition having excellent anti-corrosion performance which enables to reduce the generation of rust due to the salt water spray testing.

Solution to Problem

In order to achieve the object, the inventor of the present invention earnestly investigated for resin which replaces the epoxy resin as the coating film component. As a result, it was found that the desired object was achieved by using phenoxy resin as the coating film component, and arrived at the present invention.

In this regard, an anti-corrosive coating composition of the present invention is an anti-corrosive coating composition containing polyaniline component and coating film component, wherein the coating film component is composed of phenoxy resin.

When the anti-corrosive coating composition of the present invention is applied to the object to be rust prevented such as the steel plate or the like, the phenoxy resin composing the coating film component hardens, and forms a coating film in which the polyaniline component is dispersed. According to the anti-corrosive coating composition of the present invention, the polyaniline component is dispersed in the coating film formed by the curing of the phenoxy resin, thereby the generation of rust by the salt water spray testing can be reduced and excellent anti-corrosion performance can be obtained.

In the anti-corrosive coating composition of the present invention, a polycondensate of bisphenol A and epichlorohydrin, or a polycondensate of bisphenol A and hydroxyalkyl ether can be suitably used as the phenoxy resin. In the anti-corrosive coating composition of the present invention, for example, 2-hydroxy propyl ether can be used as the hydroxyalkyl ether.

Moreover, in the anti-corrosive coating composition of the present invention, the polyaniline component may be polyaniline particles, or may include polyaniline particles, polyvinyl butyral, and alcohol based solvent.

Moreover, it is preferable that the anti-corrosive coating composition of the present invention contains the coating film component in a range of 600 to 13000 parts by mass with respect to 100 parts by mass of polyaniline included in the polyaniline component.

If the content of the coating film component is less than 600 parts by mass with respect to 100 parts by mass of polyaniline included in the polyaniline component, there are cases where sufficient coating film cannot be formed. Furthermore, if the content of the coating film component exceeds 13000 parts by mass with respect to 100 parts by mass of polyaniline included in the polyaniline component, there are cases where sufficient anti-corrosion performance cannot be obtained.

DESCRIPTION OF EMBODIMENT

Figure 2:
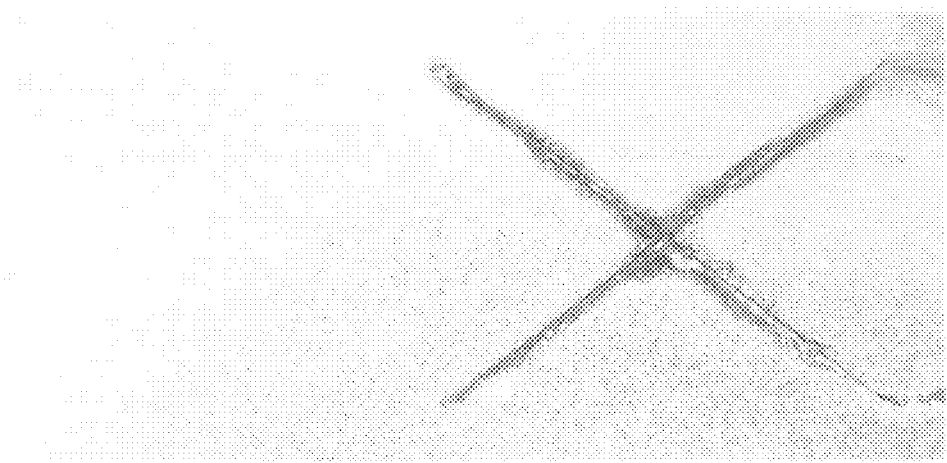
FIG. 2 is a photograph showing a result of a salt water spray testing with respect to a coating film formed on a surface of a steel plate by an anti-corrosive coating composition of Example 2.

Hereinafter, an embodiment of the present invention is further described in details with reference to the accompanying drawings.

The anti-corrosive coating composition of the present invention contains polyaniline component and coating film component, wherein the coating film component is composed of phenoxy resin.

As the phenoxy resin, for example, a polycondensate of bisphenol A and epichlorohydrin, or a polycondensate of bisphenol A and hydroxyalkyl ether can be used.

In the case where the phenoxy resin is the polycondensate of bisphenol A and hydroxyalkyl ether, the hydroxyalkyl ether is a compound expressed by the general formula (1) of below.

   (1)

In the above formula, R represents 1-5C alkylene group which is, for example, methylene group, ethylene group, n-propylene group, i-propylene group, n-butylene group, or the like.

In the present embodiment, 2-hydroxy propyl ether expressed by the formula (2) of below can be suitably used as the hydroxyalkyl ether.

[Chemical Formula 1]

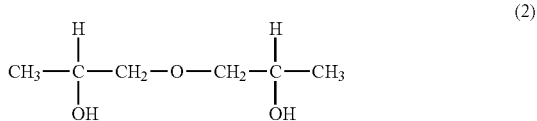   (2)

As the polycondensate of bisphenol A and epichlorohydrin, for example, jER1255HX30 (trade name) manufactured by Mitsubishi Chemical Corporation can be used. Moreover, as the polycondensate of bisphenol A and 2-hydroxy propyl ether, for example, Phenol tote YP-50EK35 (trade name) manufactured by Nippon Steel & Sumikin Chemical Co., LTD. can be used.

Furthermore, as the phenoxy resin, Phenoxy Resin PKHH (trade name) manufactured by Phenoxy Associates, Phenoxy Resin PKHB (trade name) manufactured by Phenoxy Associates, ISOPOXY506K (trade name) manufactured by Nisshoku Schenectady Kagaku Inc., or the like may be used.

In the anti-corrosive coating composition of the present invention, the polyaniline component may be polyaniline particles itself, or may be a gelatinous material including polyaniline particles, polyvinyl butyral, and alcohol based solvent.

The polyaniline particles can be obtained as particles having a diameter of approximately 10 to 50 nm, for example, by being precipitated from reaction solution obtained by adding ammonium persulfate in a mixture of aniline sulfate and sodium dodecyl sulfate for oxidative polymerization.

Moreover, the gelatinous material can be obtained as below. First, the polyaniline particles obtained as described above is mixed with polyvinyl butyral, and alcohol based solvent. Then, the alcohol based solvent is volatilized, thereby to form a solid mixture. In the solid mixture, polyaniline is uniformly dispersed and contained in a matrix of polyvinyl butyral.

Next, the solid mixture is immersed and swelled in the alcohol based solvent, and is supplied to a pressurizing dispersion device together with the alcohol based solvent. The pressurizing dispersion device is a device to which a sample together with a solvent is supplied to a narrow flow channel and which applies pressure in a range of 5 to 80 MPa, for example, applies pressure in a range of 30 to 50 MPa for ejection from the flow channel, thereby uniformly dispersing the sample in the solvent. As a result, it is able to obtain a gelatinous material in which the polyaniline particles are uniformly dispersed in the polyvinyl butyral and the alcohol based solvent.

As the alcohol based solvent, a mixed solvent of alcohol such as isopropanol or methoxypropanol, and other organic solvent can be used. As such alcohol based solvent, for example, those composed of 10 to 45 parts by mass of isopropanol, 10 to 45 parts by mass of methoxypropanol, 10 to 35 parts by mass of butanol, 5 to 25 parts by mass of xylene, 5 to 25 parts by mass of ethylbenzene can be used. More specifically, an alcohol based solvent composed of 40 parts by mass of isopropanol, 40 parts by mass of methoxypropanol, 10 parts by mass of butanol, 5 parts by mass of xylene, 5 parts by mass of ethylbenzene can be used.

Here, the manufacturing method of the gelatinous material and the physical property thereof is disclosed in details in Japanese Patent Application Laid-open No. 2014-37522.

Moreover, the anti-corrosive coating composition of the present embodiment contains the coating film component in a range of 600 to 13000 parts by mass, preferably 700 to 11000 parts by mass with respect to 100 parts by mass of polyaniline included in the polyaniline component. The anti-corrosive coating composition of the present embodiment is able to form good coating film, and in addition, can obtain excellent anti-corrosion performance by containing the coating film component in the above range with respect to 100 parts by mass of polyaniline included in the polyaniline component.

The anti-corrosive coating composition of the present embodiment can be easily produced by mixing and stirring the polyaniline component and the phenoxy resin. For the mixing and stirring, for example, stirring device such as DESPA (trade name) manufactured by Asada Iron Works, Co., LTD. or HYPER (trade name) manufactured by Ashizawa Fine Tech LTD., or the like can be used.

Moreover, by applying the anti-corrosive coating composition of the present embodiment to the object to be rust prevented such as the steel plate so as to have a thickness of 15 to 60 µm in a dry state, for example, 30 µm, it is able to form a coating film having excellent anti-corrosion performance. The application can be done, for example, by spray, air spray, brush application, roller coating, or the like.

Moreover, when forming the coating film by the anti-corrosive coating composition of the present embodiment, a top coating layer may be further provided on the coating film. The top coating layer is preferably formed by, for example, urethane resin so as to have a thickness of 15 to 60 µm, for example, 30 µm.

Moreover, the anti-corrosive coating composition of the present embodiment may further contain other additives in a range which does not adversely affect the anti-corrosion performance. As the additives, for example, colored pigment, plasticizing agent, pigment dispersing agent, emulsifying agent, thickener, scattering preventive agent, or the like can be used.

Next, Examples and Comparative Examples of the present invention are described below.

Example 1

In the present Example, 3.08 g of polyaniline particles as polyaniline component and 40 g of phenoxy resin composed of polycondensate of bisphenol A and epichlorohydrin (trade name: jER1255HX30, manufactured by Mitsubishi Chemical Corporation) as the coating film component were mixed and stirred to prepare an anti-corrosive coating composition in which the polyaniline particles were dispersed in the coating film component (phenoxy resin in the present Example).

Next, the anti-corrosive coating composition obtained in the present Example was applied on the surface of a SPC steel plate having a length of 150 mm, a width of 75 mm, and a thickness of 1.6 mm, so as to have a thickness of 30 μm in the dry state, and the coating film component was hardened to form the coating film. Then, urethane resin (trade name: EPORLE manufactured by Suzuka Fine CO., LTD.) was applied on the coating film so as to have a thickness of 30 μm in the dry state, and hardened to form a top coating layer, which was used as a sample.

Figure 1:
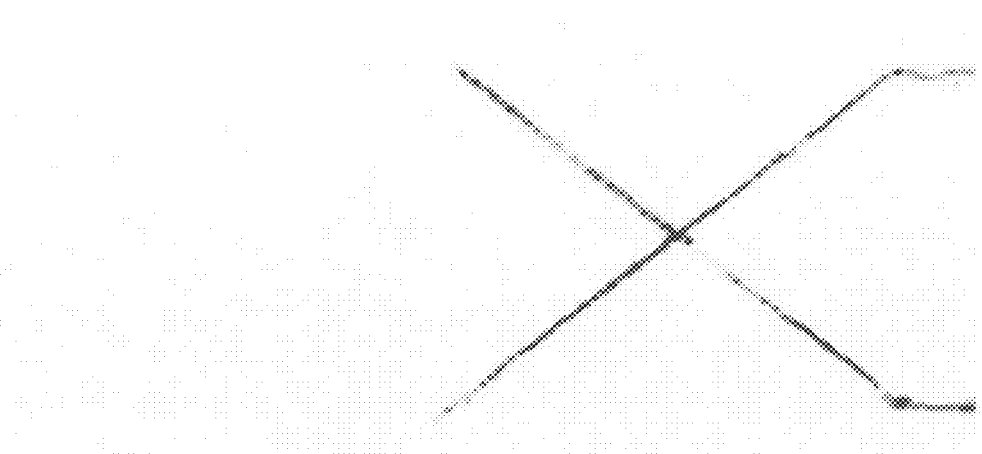
FIG. 1 is a photograph showing a result of a salt water spray testing with respect to a coating film formed on a surface of a steel plate by an anti-corrosive coating composition of Example 1.

Next, two scratches having a length of 70 mm and a depth reaching the surface of the steel plate were formed on the sample so as to cross each other, and a salt water spray device (trade name: Composite Corrosion Tester, manufactured by Itabashi Rika Kogyo Co., LTD.) was used to conduct the salt water spray testing in which salt solution having a concentration of 50 g/liter as sprayed on the steel plate surface at an amount of 0.0028 liter/min. for 600 hours according to the method prescribed in Japanese Industrial Standards JIS Z 2371. The result is shown in FIG. 1.

Example 2

In the present Example, the anti-corrosive coating composition was prepared exactly in the same manner as Example 1, except that phenoxy resin composed of polycondensate of bisphenol A and 2-hydroxy propyl ether (trade name: Phenol tote YP-50EK35, manufactured by Nippon Steel & Sumikin Chemical Co., LTD.) was used as the coating film component.

Next, the coating film and the top coating layer were formed to be used as a sample, exactly in the same manner as Example 1, except that the anti-corrosive coating composition obtained in the present Example was used.

Next, the salt water spray testing was performed for 600 hours exactly in the same manner as Example 1, except that the sample obtained in the present Example was used.

The result is shown in FIG. 2.

Comparative Example 1

In the present Comparative Example, the anti-corrosive coating composition was prepared exactly in the same manner as Example 1, except that epoxy resin (trade name: ESCO) manufactured by Kansai Paint Co., LTD. and ketimine (trade name: ESCO Curing Agent manufactured by Kansai Paint Co., LTD.) as a curing agent were used as the coating film component.

Figure 3:
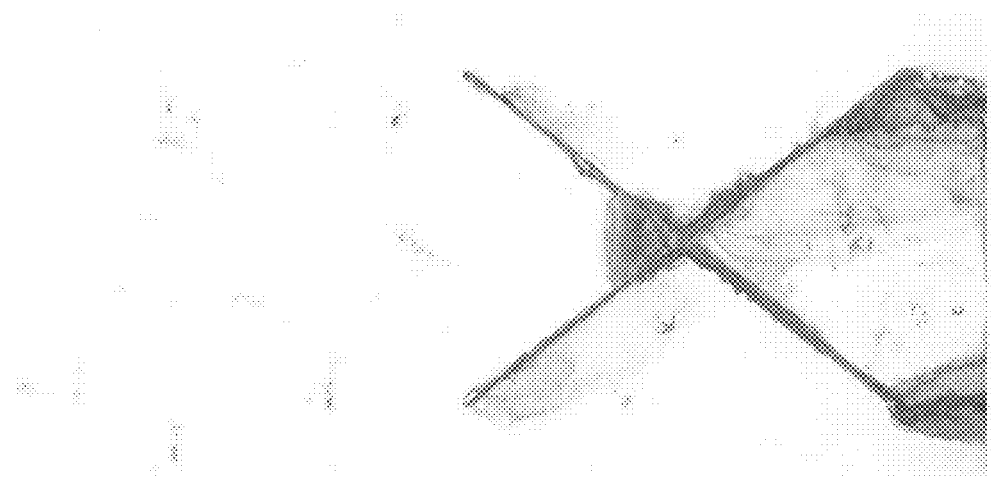
FIG. 3 is a photograph showing a result of a salt water spray testing with respect to a coating film formed on a surface of a steel plate by an anti-corrosive coating composition of Comparative Example 1.

Next, the coating film and the top coating layer were formed to be used as a sample, exactly in the same manner as Example 1, except that the anti-corrosive coating composition obtained in the present Comparative Example was used, Next, the salt water spray testing was performed exactly in the same manner as Example 1, except that the above sample was used and the testing was conducted for 576 hours. The result is shown in FIG. 3.

Comparative Example 2

In the present Comparative Example, the anti-corrosive coating composition was prepared exactly in the same manner as Example 1, except that epoxy resin (trade name: EPOMARINE PRIMER) manufactured by Kansai Paint Co., LTD. and polyamideamine as the curing agent were used as the coating film component.

Figure 4:
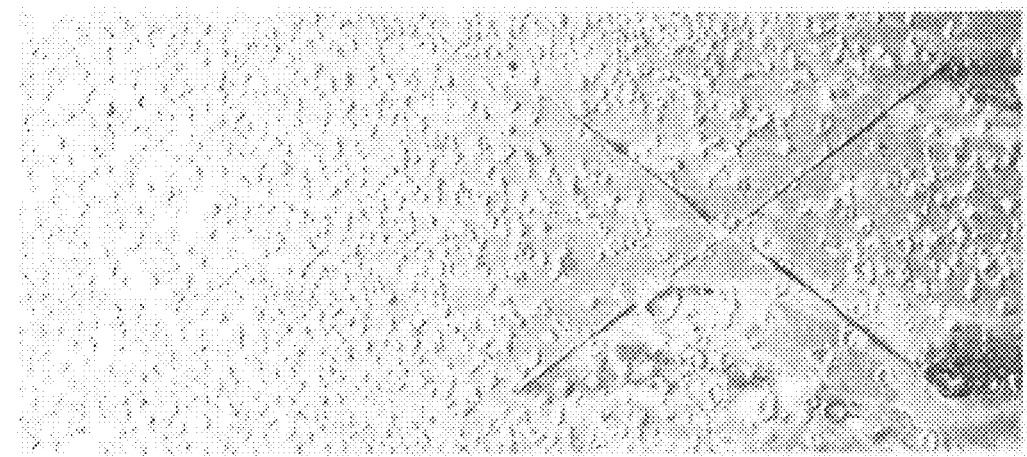
FIG. 4 is a photograph showing a result of a salt water spray testing with respect to a coating film formed on a surface of a steel plate by an anti-corrosive coating composition of Comparative Example 2.

Next, the coating film and the top coating layer were formed to be used as a sample, exactly in the same manner as Example 1, except that the anti-corrosive coating composition obtained in the present Comparative Example was used, Next, the salt water spray testing was performed exactly in the same manner as Example 1, except that the above sample was used and the testing was conducted for 576 hours. The result is shown in FIG. 4.

Comparative Example 3

In the present Comparative Example, the anti-corrosive coating composition was prepared exactly in the same manner as Example 1, except that epoxy resin (trade name: HI-PON 20-HB) manufactured by Nippon Paint Co., LTD. and exclusive curing agent thereof, were used as the coating film component.

Figure 5:
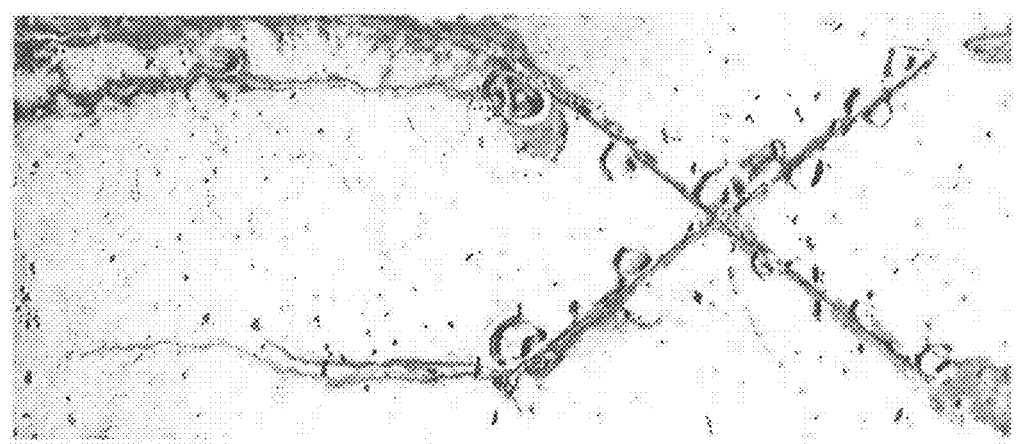
FIG. 5 is a photograph showing a result of a salt water spray testing with respect to a coating film formed on a surface of a steel plate by an anti-corrosive coating composition of Comparative Example 3.

Next, the coating film and the top coating layer were formed to be used as a sample, exactly in the same manner as Example 1, except that the anti-corrosive coating composition obtained in the present Comparative Example was used, Next, the salt water spray testing was performed exactly in the same manner as Example 1, except that the above sample was used and the testing was conducted for 576 hours. The result is shown in FIG. 5.

Comparative Example 4

In the present Comparative Example, the anti-corrosive coating composition was prepared exactly in the same manner as Example 1, except that epoxy resin (trade name: Neogosei#2300 Primer) manufactured by Shinto Paint Co., LTD. and exclusive curing agent thereof, were used as the coating film component.

Figure 6:
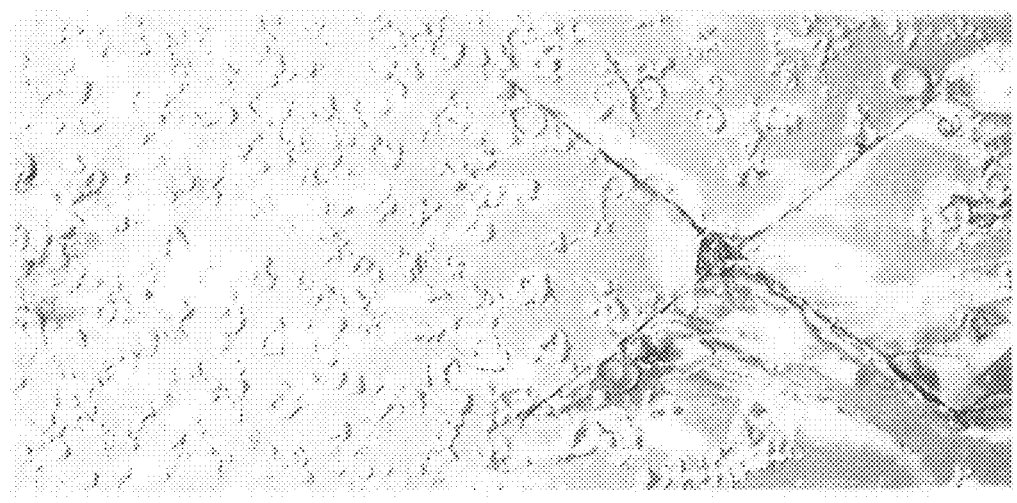
FIG. 6 is a photograph showing a result of a salt water spray testing with respect to a coating film formed on a surface of a steel plate by an anti-corrosive coating composition of Comparative Example 4.

Next, the coating film and the top coating layer were formed to be used as a sample, exactly in the same manner as Example 1, except that the anti-corrosive coating composition obtained in the present Comparative Example was used, Next, the salt water spray testing was performed exactly in the same manner as Example 1, except that the above sample was used and the testing was conducted for 576 hours. The result is shown in FIG. 6.

Comparative Example 5

In the present Comparative Example, the anti-corrosive coating composition was prepared exactly in the same manner as Example 1, except that epoxy resin (trade name: EPICON PRIMER HB) manufactured by Chugoku Marine Paints, LTD, and exclusive curing agent thereof, were used as the coating film component.

Figure 7:
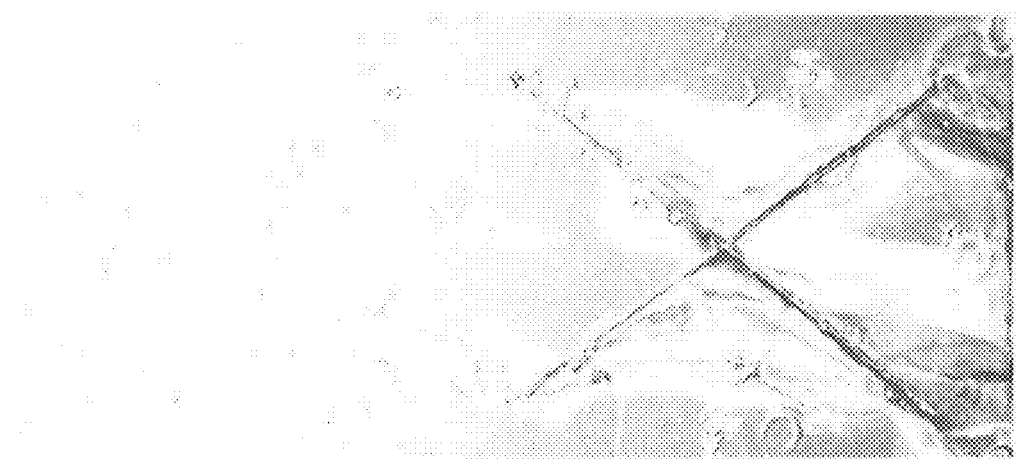
FIG. 7 is a photograph showing a result of a salt water spray testing with respect to a coating film formed on a surface of a steel plate by an anti-corrosive coating composition of Comparative Example 5.

Next, the coating film and the top coating layer were formed to be used as a sample, exactly in the same manner as Example 1, except that the anti-corrosive coating composition obtained in the present Comparative Example was used, Next, the salt water spray testing was performed exactly in the same manner as Example 1, except that the above sample was used and the testing was conducted for 576 hours. The result is shown in FIG. 7.

From FIG. 3 to FIG. 7, in the case of the anti-corrosive coating composition using epoxy resin including curing agent as the coating film component, it is clear that violent generation of rust is recognized on the steel plate having a coating film formed by such anti-corrosive coating composition.

On the other hand, from FIG. 1 and FIG. 2, in the case of the anti-corrosive coating composition using phenoxy resin composed of polycondensate of bisphenol A and epichlorohydrin (Example 1), or the anti-corrosive coating composition using phenoxy resin composed of polycondensate of bisphenol A and 2-hydroxy propyl ether (Example 2), only very slight generation of rust can be recognized on the steel plate on which the coating film was formed by such anti-corrosive coating compositions, and it is clear that such anti-corrosive coating compositions have excellent anti-corrosion performance.

EXPLANATION OF REFERENCE NUMERALS

No reference numerals.

The invention claimed is:

1. An anti-corrosive coating film consisting of a polyaniline component, coating film component, additive, and a top coating layer covering a surface of the anti-corrosive coating film, wherein the coating film component consists of phenoxy resin, and the additive consists of at least one of a colored pigment, plasticizing agent, pigment dispersing agent, emulsifying agent, thickener, or scattering preventive agent.

* * * * *